United States Patent
Mangal et al.

(10) Patent No.: US 10,783,732 B2
(45) Date of Patent: Sep. 22, 2020

(54) PASSENGER SELECTION AND SCREENING FOR AUTOMATED VEHICLES

(71) Applicant: Aptiv Technologies Limited, St. Michael (BB)

(72) Inventors: Nandita Mangal, Palo Alto, CA (US); Michael H. Laur, Mission Viejo, CA (US)

(73) Assignee: Aptiv Technologies Limited, St. Michael ( * ) Notice: Subject to any disclaimer, the term of this patent is extended or adjusted under 35 U.S.C. 154(b) by 0 days.

(21) Appl. No.: 16/214,609

(22) Filed: Dec. 10, 2018

(65) Prior Publication Data
US 2020/0184748 A1 Jun. 11, 2020

Related U.S. Application Data

(60) Provisional application No. 62/775,415, filed on Dec. 5, 2018.

(51) Int. Cl.
| | |
|---|---|
| *B60R 25/30* | (2013.01) |
| *G07C 9/37* | (2020.01) |
| *G06F 16/9035* | (2019.01) |
| *B60R 25/31* | (2013.01) |

(52) U.S. Cl.
CPC ............ *G07C 9/37* (2020.01); *B60R 25/305* (2013.01); *B60R 25/31* (2013.01); *G06F 16/9035* (2019.01)

(58) Field of Classification Search
None
See application file for complete search history.

(56) References Cited

U.S. PATENT DOCUMENTS

| | | | |
|---|---|---|---|
| 2016/0373473 A1* | 12/2016 | Truong | H04W 4/029 |
| 2017/0061110 A1 | 3/2017 | Wright et al. | |
| 2018/0075565 A1 | 3/2018 | Myers et al. | |
| 2018/0211541 A1* | 7/2018 | Rakah | G08G 1/0129 |
| 2018/0236975 A1 | 8/2018 | Myers et al. | |
| 2019/0061619 A1* | 2/2019 | Reymann | B60Q 9/00 |

OTHER PUBLICATIONS

EP Search Report in European Appln. No. 19210232.5, dated Feb. 19, 2020, 9 pages.
Swetha et al., "Automatic Authorized Vehicle Recognition System," International Conference on Sustainable Energy and Intelligent Systems, 2011, 2 pages.

* cited by examiner

*Primary Examiner* — Eileen M Adams
(74) *Attorney, Agent, or Firm* — Fish & Richardson P.C.

(57) ABSTRACT

A system for an automated vehicle includes an exterior-camera, a database, and a controller. The exterior-camera is used to detect an identification-feature of a person proximate to a host-vehicle. The database includes a customer-profile of the person. The controller-circuit is in communication with the exterior-camera and the database. The controller-circuit is configured to determine an identity of the person in accordance with the identification-feature, recall from the database the customer-profile of the person based on the identity, and operate the host-vehicle to either select or reject the person as a passenger in accordance with the customer-profile of the person.

21 Claims, 3 Drawing Sheets

PASSENGER SELECTION AND SCREENING FOR AUTOMATED VEHICLES

TECHNICAL FIELD OF INVENTION

This disclosure generally relates to a system for an automated vehicle, and more particularly relates to a system that operates a host-vehicle to either select or reject, i.e. screen, a person as a passenger in accordance with a customer-profile of the person.

BRIEF DESCRIPTION OF DRAWINGS

The present invention will now be described, by way of example with reference to the accompanying drawings, in which.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

'One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Figure 1:
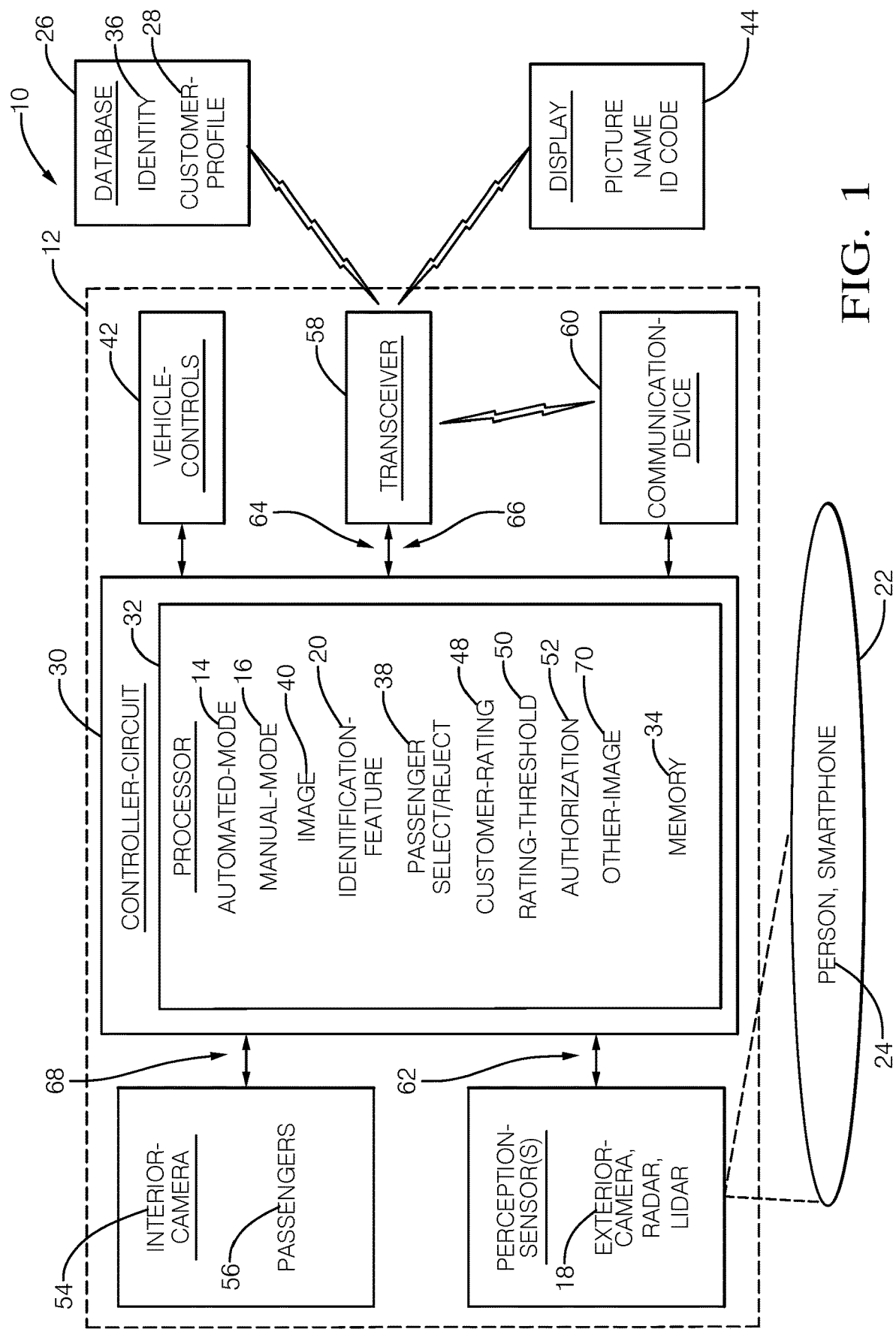
FIG. 1 is a diagram of a system for selecting passengers in accordance with one embodiment.

FIG. 1 illustrates a non-limiting example of a system 10, for operating an automated vehicle, e.g. a host-vehicle 12. The host-vehicle 12 may be characterized as an automated vehicle. As used herein, the term automated vehicle may apply to instances when the host-vehicle 12 is being operated in an automated-mode 14, i.e. a fully autonomous mode, where a human-operator (not shown) of the host-vehicle 12 may do little more than designate a destination to operate the host-vehicle 12. The system 10 described herein is especially useful for autonomous taxis or shuttles such as an automated-mobility-on-demand (AMOD) type of vehicle as the system 10 enables an AMOD to decide to pick-up or ignore a potential client based on a customer-profile of the potential client. However, full automation is not a requirement. It is contemplated that the teachings presented herein are useful when the host-vehicle 12 is operated in a manual-mode 16 where the degree or level of automation may be limited to assisting a human-operator (not shown) of the host-vehicle 12 to select who from a group of people the human-operator should pick up and transport. That is, when operating in the manual-mode 16, the human-operator may be generally in control of the steering, accelerator, and brakes of the host-vehicle 12.

The system 10 includes an exterior-camera 18 used to detect an identification-feature 20 of a person 24 proximate to (e.g. within 75 meters) the host-vehicle 12. The exterior-camera 18 is so named as it is positioned, oriented, or configured to have a field-of-view of an area 22 external to or surrounding the host-vehicle 12. The exterior-camera 18 may be mounted on the host-vehicle 12, or the exterior-camera 18 may be a camera associated with infrastructure, e.g. a camera located at a site where people gather to be picked up by transportation services, i.e. a taxi stand or shuttle stop. As used herein, the identification-feature 20 may be generally based on facial recognition, the techniques for doing so being well known. Alternatively, the identification-feature 20 may be based on information displayed on smartphone, tablet, or other device capable of conveying a light and/or color code that is held by the person 24 in a manner to be viewable by the exterior-camera 18.

The system 10 includes a database 26 that includes a customer-profile 28 of the person 24. The database 26 may be stored in memory 34 on-board the host-vehicle 12, and/or stored remotely in the cloud. The customer-profile 28 may include a variety of information about the person 24 such as, but not limited to: frequent-rider status (e.g. silver, gold, platinum), a list of prior or frequent destinations, a notification of special-needs such as accommodations for a wheelchair, customer preferences for type of AMOD, e.g. a preference for no ride-sharing and/or a desired luxury level of AMOD, preferences for music or news during the ride, etc. The customer-profile 28 may also include a notice that the person 24 is listed on a banned customer list due to past bad behavior and/or a criminal record. If the person 24 is a child, there may be a notice that the parent of the child does not want the child to travel through specific areas, or share the host-vehicle 12 with certain types of passengers or passengers having certain destinations. It is also contemplated that the system 10 may be configured to select passengers from waiting customers because all the passengers selected are going to same location, e.g. grouping of airport passengers and limiting the number of passengers going to the airport to allow for extra room as they have luggage.

The system 10 includes a controller-circuit 30 in communication with the external-camera 18 and the database 26. The communication may be by way of wires, optical fiber, or wireless communications, e.g. Wi-Fi, cellular-phone-network, dedicated-short-range-communications (DSRC), BLUETOOTH®, and the like, as will be recognized by those in the art. The controller-circuit 30, hereafter sometimes referred to as the controller 30, may include one or more instances of a processor 32 such as one or more instances of a microprocessor or other control circuitry such as analog and/or digital control circuitry including an application specific integrated circuit (ASIC) for processing data as should be evident to those in the art. While the system 10 described herein is generally described in terms of having a single instance of the controller 30, it is recognized that the functions of the controller 30 may be shared or distributed among several instances of controllers that are each configured for some specific task. Hereafter, any reference to the controller 30 being configured for something is to also be interpreted as suggesting that the processor 32 may also be configured for the same thing. It is also recognized that there may be multiple instances of processors in any instance of the controller 30. The controller 30 may include memory 34, i.e. non-transitory computer-readable storage-medium, including non-volatile memory, such as electrically erasable programmable read-only memory (EEPROM) for storing one or more routines, thresholds, and captured data. The memory 34 may be part of the processor 32, or part of the controller 30, and/or separate from the controller 30 such as remote memory stored in the cloud. The one or more routines may be executed by the controller 30 or the processor 32 to perform steps for determining how to operate the host-vehicle 12 regarding the identity 36 and the customer-profile 28 of the person 24 based on signals received by the controller 30 from, but not limited to, the exterior-camera 18 as described herein.

To this end, the controller-circuit 30 is configured to determine the identity 36 of the person 24 based on or in accordance with the identification-feature 20. For example, if facial-recognition is being used, then an image 40 (rendered by the exterior-camera 18) of the face of the person 24 may be analyzed using known facial-recognition algorithms to generate a list of facial-features, and the results of that analysis is used to search the database 26 for corresponding facial-features, and the identity 36 associated with those facial-features. Given the identity 36, the controller 30 may then recall (i.e. retrieve or read) from the database 26 the customer-profile 28 of the person 24 based on or associated with the identity 36. In this way, who becomes a passenger in the host-vehicle 12 can be screened rather than simply allow any person who approaches the host-vehicle 12 to board or enter the host-vehicle 12. This screening process may be advantageous for the safety and/or comfort of those passengers already on board the host-vehicle 12, and/or other persons who may become passengers after the person 24 has been selected or rejected.

The controller 30 is further configured to operate the host-vehicle 12 to either select or reject the person 24 as a passenger 38 in accordance with the customer-profile 28 of the person 24. That is, the controller 30 operates the host-vehicle 12 in some manner to either invite the person 24 to board the host-vehicle 12, i.e. select the person 24, or prevent the person 24 from boarding the host-vehicle 12, i.e. reject the person 24. To operate the host-vehicle 12, the controller 30 may operate the vehicle-controls 42 of the host-vehicle 12 such as, but not limited to: steering, brakes, accelerator, doors and/or door-locks, interior and/or exterior lighting, a horn or speaker, and/or a display 44. For example, if the person 24 is selected to be the passenger 38 (or one of multiple passengers), the controller 30 may steer the host-vehicle 12 towards the person 24, stop close to the person 24, and open a door of the host-vehicle 12 so the person 24 can enter the host-vehicle 12. Alternatively, if the person 24 is rejected, the controller 30 may operate the host-vehicle 12 to move away from where the person 24 is standing, and/or lock the doors of the host-vehicle 12 so the person 24 is prevented from entering or boarding the host-vehicle 12.

Figure 2:
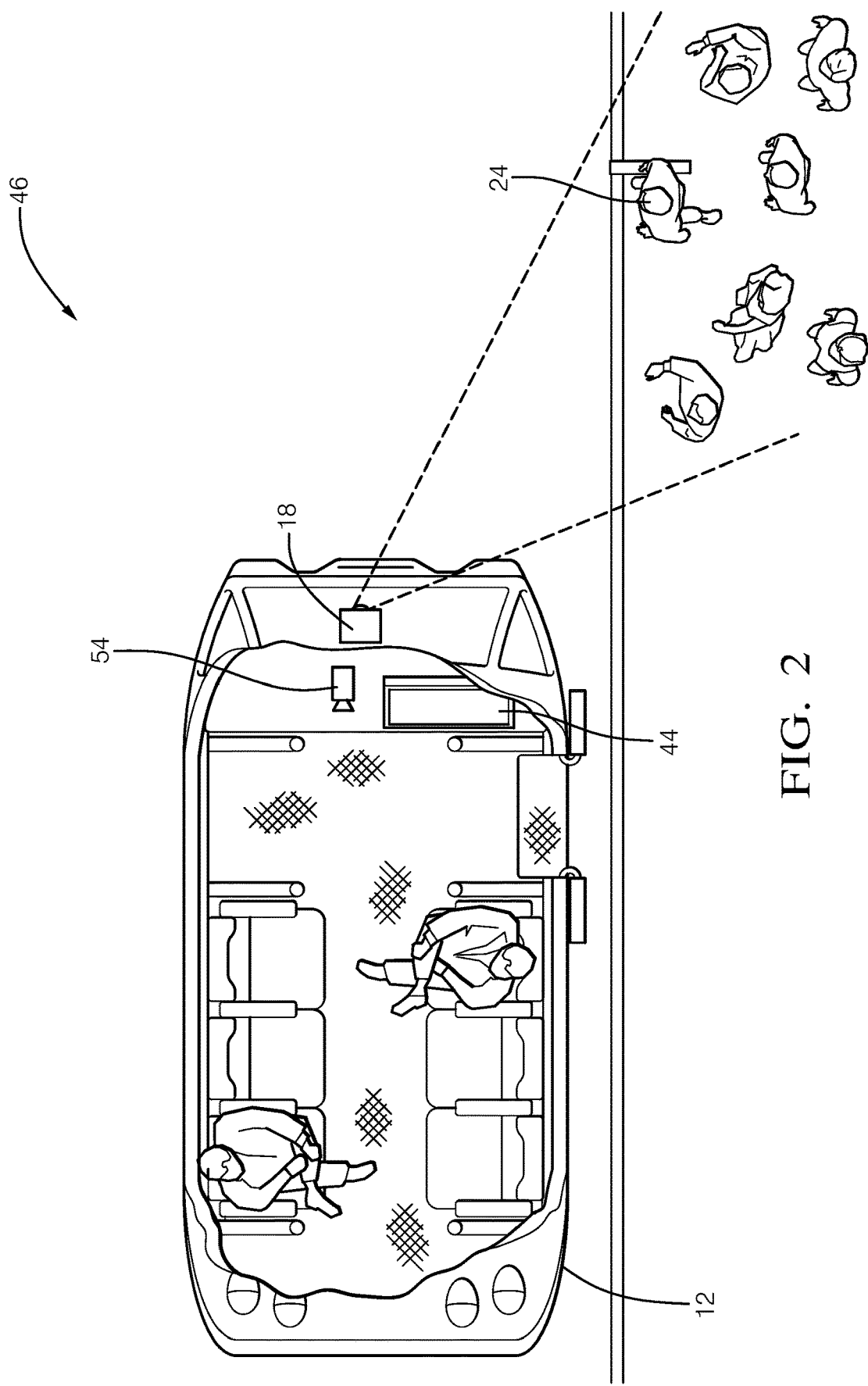
FIG. 2 is scenario encountered by the system of FIG. 1 in accordance with one embodiment.

FIG. 2 illustrates a non-limiting example of a scenario 46 that may be encountered by the host-vehicle 12 equipped with the system 10. It is expected that situations will occur where there are more people seeking transportation than there are seats available for new passengers. To help determine who should be selected to be a passenger 38, the customer-profile 28 may include a customer-rating 48 that is conveyed to the controller 30. The customer-rating 48 may be based on how often the person 24 uses the transportation service provided by the host-vehicle 12, i.e. a frequent-flyer status, or the customer-rating 48 may be based on a subscription fee paid by the person, e.g. a preferred-customer fee. The controller-circuit 30 may select the person 24 to be the passenger 38 in response to a determination that the customer-rating 48 is greater than a rating-threshold 50. Alternatively, the customer-rating 48 may be based on other criteria such as age, disability, occupation (e.g. police/military get preferential treatment), etc. If there are more people waiting for transportation who have a customer-rating 48 that is greater than the rating-threshold 50, then those with the highest rating may get preference, or a random selection may be made by the controller 30.

To convey to or inform the person 24 that he/she has been selected to be the passenger 38, the system 10 may include a display 44 that is viewable by the person 24. As suggested in FIG. 2, the display 44 may be mounted on host-vehicle 12. Alternatively, as suggested in FIG. 1, the display 44 may be located separate or apart from the host-vehicle 12, e.g. mounted on a post or wall near a designated pick-up site so that all people waiting for transportation can view the display 44. The controller-circuit 30 may be configured to operate the display 44 to show an authorization 52 that the person 24 is authorized (i.e. has been selected) to board the host-vehicle 12. The authorization 52 shown on the display 44 may include, but is not limited to, a name, photograph, or anonymous identification code of the person 24, or any combination thereof. It is contemplated that the authorization may be displayed even if the external-camera 18 does not 'see' the person 24. For example, the authorization 52 may be displayed based on prior reservation.

The system 10 may also include an interior-camera 54 used to verify the identity 36 of passengers 56 (which may include the passenger 38) transported by the host-vehicle 12. This verification of the identities of the passengers 56 may be advantageous or even necessary if there is a rush of persons boarding the host-vehicle 12, and one or more of those persons may not be authorized to be on-board. The lack of authorization may be due to the destination of the host-vehicle 12 being different from one of the persons, i.e.

someone got in the wrong vehicle, or there are other security reasons why a person should not be on-board the host-vehicle 12. In response, the system 10 may use the display 44 and/or a speaker (not shown) to issue a warning to un-authorized person, sound an alarm, and/or wait until un-authorized person exits.

The system 10 may also include a transceiver 58 used to communicate with a communication-device 60 (e.g. smartphone or tablet) carried by the person 24 to verify the identity 36 of the person 24. For example, the transceiver 58 may be used to communicate with the communication-device 60 to request a password and/or payment from the person 24. The communication may advantageously be by way of BLUETOOTH® or other short-range communication protocol so that it can be determined that the communication-device 60 is traveling in the host-vehicle 12 and not some device outside of the host-vehicle 12 that will become out of range after the host-vehicle 12 travels a distance that corresponds to the range limit of the communication protocol.

Returning now to FIG. 1, the controller-circuit 30 has an input 62 configured to communicate with the exterior-camera 18, and a data-port 64 configured to access the database 26 via the transceiver 58 if the database 26 is located off-board the host-vehicle 12. The controller-circuit 30 also includes an output 66 configured to communicate with the display 44. FIG. 1 shows the display 44 as being off-board the host-vehicle 12, so the transceiver 58 may be used for this configuration. However, if the display 44 is on-board, the output 66 may be couple directly to the display 44 by way of, for example, wires. The controller-circuit 30 may also include an other-input 68 configured to communicate with the interior-camera 54.

Figure 3:
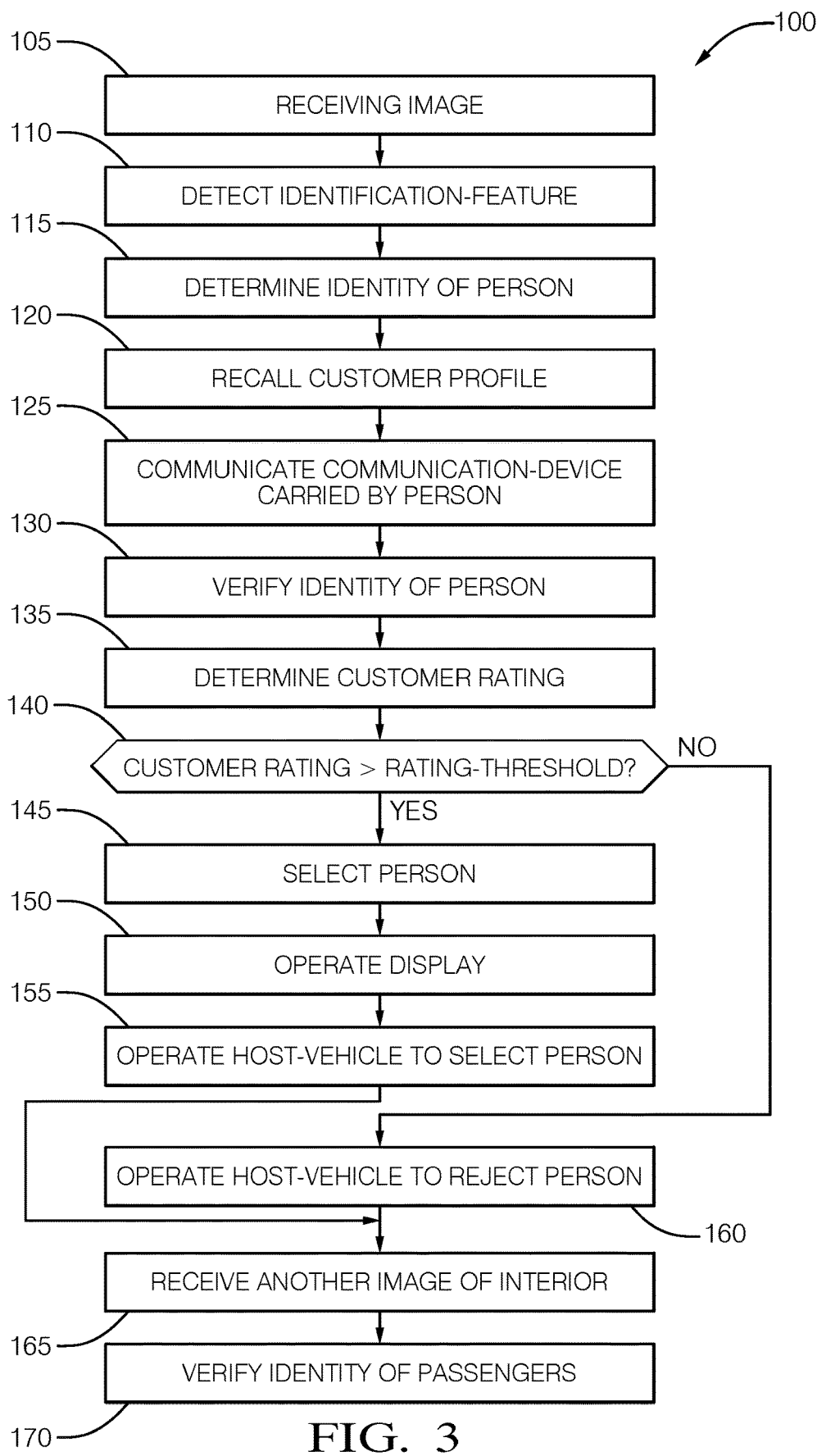
FIG. 3 is a method of operating the system of FIG. 1 in accordance with one embodiment.

FIG. 3 illustrates a non-limiting example of method 100 of operating the host-vehicle 12 to control who is transported by the host-vehicle 12.

Step 105, RECEIVING IMAGE, may include receiving an image 40 from an exterior-camera 18. The image 40 is used to detect an identification-feature 20 of a person 24 proximate to the host-vehicle 12. The image 40 may be communicated over wires if the exterior-camera 18 is mounted on the host-vehicle 12, or may be communicated wirelessly if the exterior-camera 18 is off-board the host-vehicle 12, e.g. part of the infrastructure such as a crowd monitoring camera.

Step 110, DETECT IDENTIFICATION-FEATURE, may include the controller 30 or the processor 32 processing the image 40 to determine the identification-feature 20, i.e. facial-features, of the person 24. The identification-feature 20 may then be sent to the data-base 26. Alternatively, the image 40 may be sent to the database 26, and the image-processing needed to determine the identification-feature 20 may be performed at the database 26. By way of example and not limitation, the identification-feature 20 may be a ratio of the distance between the eyes to the distance from the eyes to the mouth or nose. The techniques used for facial recognition are well-known and no discussed in any substantive detail herein.

Step 115, DETERMINE IDENTITY OF PERSON, may include determining an identity 36 of the person based on the identification-feature 20. That is, the database 26 is searched for a match for the identification-feature 20, and when a match is found the identity 36 of the person 24 is known.

Step 120, RECALL CUSTOMER-PROFILE, may include recalling from the database 26 the customer-profile 28 of the person based on the identity 36. That is, once the identity 36 is known, the customer-profile 28 can be retrieved or recalled from the database 26. The customer-profile 28 may include, but is not limited to information regarding personal preferences of the person 24 such as music preferences or shared ride preferences.

Step 125, COMMUNICATE COMMUNICATION-DEVICE CARRIED BY PERSON, may include communicating with a communication-device 60 (e.g. smartphone, smartwatch, or tablet) in the host-vehicle 12 that is carried by the person 24 to verify the identity of the person 24 and/or process a financial transaction to render payment for the transportation provided by the host-vehicle 12.

Step 130, VERIFY IDENTITY OF PERSON, may include matching information such as the name of the person 24 indicated by the identity 36 from the database 26 to the name of the person 24 indicated by the communication with the communication-device 60.

Step 135, DETERMINE CUSTOMER-RATING, may include determining a customer-rating 48 of the person 24 in accordance with the customer-profile 28. The customer-rating 48 may be, for example, like a frequent-flyer status that may give the person 24 some sort of priority over others with a lower customer-rating. Alternatively, the customer-rating 48 may indicate that the person 24 should not transported or allowed to enter/board the host-vehicle 12 because of, for example, a criminal record or that the police are searching for the person 24.

Step 140, CUSTOMER-RATING>RATING-THRESHOLD?, may include operating the host-vehicle 12 to either select or reject the person 24 as a passenger 38 in accordance with the customer-profile 28 of the person 24. The rating-threshold 50 may be set to some baseline value if there are enough seats available in the host-vehicle 12 for all persons waiting where the host-vehicle 12 is to stop and pick-up passengers. However, if there are not enough seats, the rating-threshold 50 may be increased so that only the most desirable customers can board the host-vehicle 12. If the customer-rating 48 of the person 24 is greater than the rating-threshold 50, the method 100 proceeds to step 145. Otherwise the method 100 proceeds to step 160.

Step 145, SELECT PERSON, may include selecting the person 24 to be the passenger 38 in response to a determination that the customer-rating 48 is greater than the rating-threshold 50. Selecting the person 24 may include determining a distance to the person 24 so that the host-vehicle 12 can steer towards and stop close to the person 24.

Step 150, OPERATE DISPLAY, may include operating a display 44 to show an authorization 52 that the person 24 is authorized to board the host-vehicle 12. The authorization 52 shown in the display 44 may be in the form of, but not limited to, a photograph of the person 24, the name of the person 24, an anonymous identification code associated with the person, or any combination thereof, all of which can be retrieved or recalled from the database 26.

Step 155, OPERATE HOST-VEHICLE TO SELECT PERSON, may include the controller 30 operating the vehicle-controls 42 to steer the host-vehicle 12 toward the person 24, stopping the host-vehicle as close as possible to the person 24, and possibly opening the door of the host-vehicle 12 so the person 24 can enter the host-vehicle 12.

Step 160, OPERATE HOST-VEHICLE TO REJECT PERSON, may include the controller 30 operating the vehicle-controls 42 to steer the host-vehicle 12 away from or past the person 24, and possibly locking the door of the host-vehicle 12 so the person 24 cannot enter the host-vehicle 12.

Step 165, RECEIVE OTHER-IMAGE OF INTERIOR, is an optional step that may include receiving an other-image 70 from the interior-camera that has a field-of-view of the interior of the host-vehicle 12. The interior-camera may include multiple instances of cameras so that images of each of the passengers 56 in the host-vehicle 12 can be obtained, so the other-image may consist of multiple images, one or more images from each of the cameras.

Step 170, VERIFY IDENTITY OF PASSENGERS, is an optional step that may include verifying the identity of passengers 38 transported by the host-vehicle 12 in accordance with the other-image 70. For example, the other-image of the passenger 38 in the host-vehicle 12 may be compared to the image 40 and/or a stored image retrieved from the database 26 to verify that the passenger 38 is or is not the person 24.

Described herein is a first device 30 that includes one or more processors 30; memory 34; and one or more programs 105-170 stored in memory 34. The one or more programs 105-170 provide instructions for performing all or part of the method 100. Also, described herein is a non-transitory computer-readable storage-medium 34 that includes one or more programs 105-170 for execution by one or more processors 32 of a first device 30. The one or more programs 105-170 include instructions which, when executed by the one or more processors 32, cause the first device 30 to perform all or part of the method 100.

Accordingly, a system 10, a controller-circuit 30 for the system 10, and a method 100 of operating the system 10 are provided. The system 10 and the method 100 provide a means for an automated vehicle such as an automated taxi or AMOD to determine which persons in a crowd of people should be allowed to enter and be transported by the host-vehicle 12, and ways to operate the host-vehicle 12 to either encourage the person 24 to enter if he/she is selected, or prevent the person 24 from gaining access to the host-vehicle 12 if he/she is rejected.

While this invention has been described in terms of the preferred embodiments thereof, it is not intended to be so limited, but rather only to the extent set forth in the claims that follow.

We claim:

1. A system for an automated vehicle, said system comprising:
    an exterior-camera used to detect an identification-feature of a person proximate to a host-vehicle;
    a database that includes a customer-profile of the identified person; and
    a controller-circuit in communication with the exterior-camera and the database, wherein the controller-circuit is configured to determine an identity of the person in accordance with the identification-feature while the person is external to the host-vehicle, recall from the database the customer-profile of the identified person, and operate the host-vehicle to either select or reject the identified person as a passenger before the identified person boards the host-vehicle in accordance with the customer-profile of the identified person.

2. The system in accordance with claim 1, wherein the customer-profile includes a customer-rating, and the controller-circuit selects the identified person to be the passenger in response to a determination that the customer-rating is greater than a rating-threshold before the identified person boards the host-vehicle.

3. The system in accordance with claim 1, wherein the system includes a display viewable by the person while the person is external to the host-vehicle, wherein the controller-circuit is configured to operate the display to show an authorization that the identified person is authorized to board the host-vehicle before the identified person boards the host-vehicle.

4. The system in accordance with claim 1, wherein the system includes an interior-camera used to verify the identity of passengers transported by the host-vehicle.

5. The system in accordance with claim 1, wherein the system includes a transceiver used to communicate with a communication-device carried by the person to verify the identity of the person.

6. A controller-circuit for an automated vehicle, said controller-circuit comprising:
    an input configured to communicate with an exterior-camera used to detect an identification-feature of a person proximate to a host-vehicle while the person is external to the host-vehicle;
    a data-port configured to access a database that includes a customer-profile of the identified person; and
    a processor in communication with the camera and the database, wherein the processor is configured to determine an identity of the person based on the identification-feature while the identified person is external to the host-vehicle, recall from the database the customer-profile of the identified person, and operate the host-vehicle to either select or reject the identified person as a passenger before the identified person boards the host-vehicle in accordance with the customer-profile of the identified person.

7. The controller-circuit in accordance with claim 6, wherein the customer-profile includes a customer-rating, and the controller-circuit selects the identified person to be the passenger in response to a determination that the customer-rating is greater than a rating-threshold before the identified person boards the host-vehicle.

8. The controller-circuit in accordance with claim 6, wherein the controller-circuit includes an output configured to communicate with a display viewable by the person while the person is external to the host-vehicle, wherein the controller-circuit is configured to operate the display to show an authorization that the identified person is authorized to board the host-vehicle before the identified person boards the host-vehicle.

9. The controller-circuit in accordance with claim 6, wherein the controller-circuit includes an other-input configured to communicate with an interior-camera used to verify the identity of passengers transported by the host-vehicle.

10. The controller-circuit in accordance with claim 6, wherein the controller-circuit includes a transceiver used to communicate with a communication-device carried by the person to verify the identity of the person.

11. A method of operating an automated vehicle, said method comprising:
    receiving from an exterior-camera an image used to detect an identification-feature of a person proximate a host-vehicle while the person is external to the host-vehicle;
    recalling from a database a customer-profile of the identified person;
    determining an identity of the person based on the identification-feature;
    recalling from the database the customer-profile of the identified person based on the identity; and
    operating the host-vehicle to either select or reject the identified person as a passenger before the identified person boards the host-vehicle in accordance with the customer-profile of the identified person.

12. The method in accordance with claim 11, wherein method includes
   determining a customer-rating of the identified person in accordance with the customer-profile; and
   selecting the identified person to be the passenger in response to a determination that the customer-rating is greater than a rating-threshold before the identified person boards the host-vehicle.

13. The method in accordance with claim 11, wherein the method includes
   operating a display, viewable by the person while the person is external to the host-vehicle, to show an authorization that the identified person is authorized to board the host-vehicle before the identified person boards the host-vehicle.

14. The method in accordance with claim 11, wherein the method includes receiving an other-image from an interior-camera; and
   verifying the identity of passengers transported by the host-vehicle in accordance with the other-image.

15. The method in accordance with claim 11, wherein the method includes
   communicating with a communication-device carried by the person to verify the identity of the person.

16. The system in accordance with claim 2, wherein the customer-rating is based on at least one of an age, a disability, and an occupation of the identified person.

17. The system in accordance with claim 2, wherein the controller selects the identified person with the highest customer-rating to be the passenger.

18. The controller-circuit in accordance with claim 7, wherein the customer-rating is based on at least one of an age, a disability, and an occupation of the identified person.

19. The controller-circuit in accordance with claim 7, wherein the controller selects the identified person with the highest customer-rating to be the passenger.

20. The method in accordance with claim 12, wherein the customer-rating is based on at least one of an age, a disability, and an occupation of the identified person.

21. The method in accordance with claim 12, wherein the controller selects the identified person with the highest customer-rating to be the passenger.

* * * * *